United States Patent [19]

Tsukase et al.

[11] Patent Number: 4,956,456

[45] Date of Patent: Sep. 11, 1990

[54] BETAINE-TYPE CYAN MONOAZO DYES FOR DYING AND PRINTING FIBROUS MATERIALS

[75] Inventors: Masaaki Tsukase; Kozo Sato, both of Kanagawa, Japan

[73] Assignee: Fuji Photo Film Co., Ltd., Kanagawa, Japan

[21] Appl. No.: 442,500

[22] Filed: Dec. 1, 1989

Related U.S. Application Data

[63] Continuation of Ser. No. 135,202, Dec. 21, 1987, abandoned.

[30] Foreign Application Priority Data

Dec. 19, 1986 [JP] Japan ............................... 61-302894

[51] Int. Cl.$^5$ ........................ C09B 44/02; D06P 1/41; D06P 3/24; D06P 3/79

[52] U.S. Cl. .................................... 534/615; 534/589; 534/603; 534/604; 534/605; 534/650; 534/730; 534/830; 534/852; 534/857; 562/47; 564/99

[58] Field of Search ................ 534/603, 604, 605, 615

[56] References Cited

U.S. PATENT DOCUMENTS

| | | | |
|---|---|---|---|
| 3,252,964 | 5/1966 | Fuchs et al. | 534/603 |
| 3,524,842 | 8/1970 | Grossmann et al. | 534/615 X |
| 3,652,532 | 3/1972 | Blackwell | 534/603 |
| 3,674,772 | 7/1972 | Entschell et al. | 534/603 |
| 4,248,772 | 2/1981 | Long | 534/615 X |
| 4,435,334 | 3/1984 | Stohr et al. | 534/603 X |
| 4,556,632 | 12/1985 | Sato et al. | 430/562 |

FOREIGN PATENT DOCUMENTS

| | | | |
|---|---|---|---|
| 3413022 | 10/1985 | Fed. Rep. of Germany | 534/603 |

*Primary Examiner*—Floyd D. Higel
*Attorney, Agent, or Firm*—Sughrue, Mion, Zinn, Macpeak & Seas

[57] ABSTRACT

The present invention is directed towards a betaine-type monoazo dye for dying and printing fibrous materials, represented by formula (I):

$$\text{Dye—X—Y} \quad (I)$$

wherein Dye represents a cyan dye anion represented by formula (II);

X represents a bond or linking group;

Y represents quaternary ammonium; and

Dye and X are bonded to each other via A, $B^1$, $B^2$, $B^3$, $B^4$ or $B^5$ in formula (II):

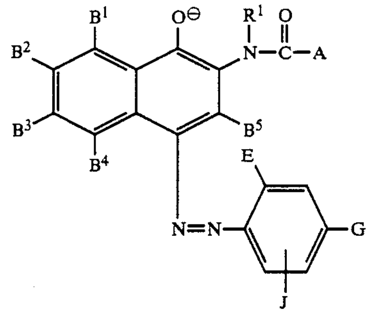

wherein $B^1$, $B^2$, $B^3$, $B^4$ and $B^5$ are the same or different, and each represents a member selected from the group consisting of a bond, hydrogen, alkyl, halogen, $—OR^4$, $—CO_2R^4$,

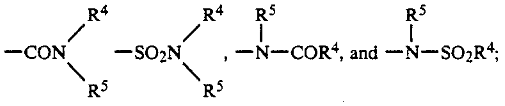

wherein $R^4$ and $R^5$ are the same or different and each represents a member selected from the group consisting of hydrogen, alkyl and aryl, or $R^4$ and $R^5$ are taken together to form 5- or 6-membered heterocyclic ring containing oxygen, nitrogen, sulfur or combinations thereof as heteroatoms;

A represents a member selected from the group consisting of hydrogen, alkyl, aryl, cycloalkyl, a 5- or 6-membered heterocyclic ring containing oxygen, nitrogen, sulfur or combinations thereof as heteroatoms and

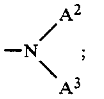

wherein $A^2$ and $A^3$ have the same meaning as A, or $A^2$ and $A^3$ are bonded to each other to form a 5- or 6-membered heterocyclic ring containing oxygen, nitrogen, sulfur or combinations thereof as heteroatoms;

E represents a member selected from the group consisting of hydrogen, halogen, cyano, hydroxyl, carboxyl, alkyl, aryl, a 5- or 6-membered heterocyclic ring containing oxygen, nitrogen, sulfur or combinations thereof as heteroatoms, alkoxy, aryloxy, alkylthio, arylthio, carbacylamino, sulfonylamino, carbamoyl, amino, alkylsulfonyl and phenylsulfonyl;

G represents a member selected from the group consisting of cyano, alkylsulfonyl and phenylsulfonyl;

J represents a member selected from the group consisting of hydrogen, halogen, cyano, alkylsulfonyl and phenylsulfonyl; and $R^1$ represents a member selected from the group consisting of hydrogen and alkyl.

13 Claims, No Drawings

BETAINE-TYPE CYAN MONOAZO DYES FOR DYING AND PRINTING FIBROUS MATERIALS

This is a continuation of application Ser. No. 07/135,202, filed 12/21/87, now abandoned.

FIELD OF THE INVENTION

The present invention relates to novel betaine-type monoazo dyes.

BACKGROUND OF THE INVENTION

A substantial number of organic dyes have been synthesized up to the present, which can dye or print synthetic fibers, etc. in blue or dark blue. However, very few of the known dyes have both sufficient fastness (for example, to light, heat and sublimation), with high color density and sharp cyan hue, and satisfactory operative characteristics including, for example, dyeability and migration.

SUMMARY OF THE INVENTION

A first object of the present invention is to provide novel dyes having a blue to cyan hue with a sharp and high color density.

A second object of the present invention is to provide novel dyes having good fastness to light, heat and sublimation.

A third object of the present invention is to provide dyes having good dyeability and migration.

With the above objects in mind, the present inventors have found that novel betaine-type cyan monoazo dyes represented by the following formula (I) can effectively attain the above and other objects and have both satisfactory fastness and sufficient operative characteristics as outlined above:

Dye—X—Y (I)

wherein Dye represents a cyan dye anion group represented by the following formula (II);

X represents a mere bond or a linking group;

Y represents a quaternary ammonium group; and

Dye and X are bonded to each other via A, $B^1$, $B^2$, $B^3$, $B^4$ or $B^5$ in formula (II):

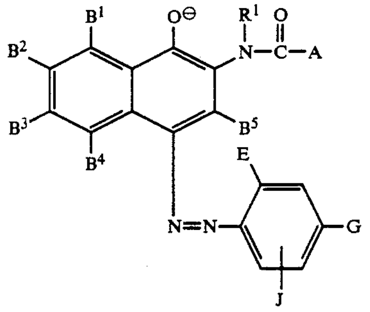

(II)

wherein $B^1$, $B^2$, $B^3$, $B^4$ and $B^5$, which may be the same or different, each represents a mere bond, a hydrogen atom, an alkyl group, a halogen atom,

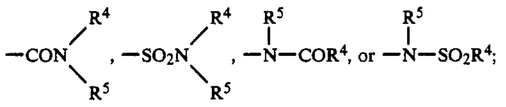

wherein $R^4$ and $R^5$, which may be the same or different, each represents a hydrogen atom, an alkyl group or an aryl group, or $R^4$ and $R^5$ are taken together to form a 5- or 6-membered ring;

A represents a hydrogen atom, an alkyl group, an aryl group, a cycloalkyl group, a heterocyclic group or

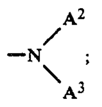

wherein $A^2$ and $A^3$ have the same meaning as A, or $A^2$ and $A^3$ are bonded to each other to form a hetero ring;

E represents a hydrogen atom, a halogen atom, a cyano group, a hydroxyl group, a carboxyl group, an alkyl group, an aryl group, a heterocyclic group, an alkoxy group, an aryloxy group, an alkylthio group, an arylthio group, an carbacylamino group, a sulfonylamino group, a carbamoyl group, an amino group, an alkylsulfonyl group or a phenylsulfonyl group;

G represents a cyano group, an alkylsulfonyl group or a phenylsulfonyl group;

J represents a hydrogen atom, a halogen atom, a cyano group, an alkylsulfonyl group or a phenylsulfonyl group; and $R^1$ represents a hydrogen atom or an alkyl group.

DETAILED DESCRIPTION OF THE INVENTION

The novel dyes of the present invention will be described in detail hereinafter.

The alkyl group represented by A may optionally have substituent(s) and is preferably a linear, branched or cyclic alkyl group having from 1 to 8 carbon atoms, for example, a methyl group, a chloromethyl group, an ethyl group, an n-propyl group, a t-butyl group, an n-butyl group, a 2-ethylhexyl group, a 2,2-dimethylpropyl group, a sec-butyl group, a benzyl group, etc. The cycloalkyl group represented by A is preferably a 5- or 6-membered cycloalkyl group having from 5 to 8 carbon atoms, for example, a cyclopentyl group, a cyclohexyl group, etc.

The aryl group represented by A may optionally have substituent(s) and is preferably an aryl group having from 6 to 10 carbon atoms, including, for example, a phenyl group, a naphthyl group, a tolyl group, etc.

The heterocyclic group represented by A may optionally have substituent(s) and is preferably a 5- or 6-membered heterocyclic group containing oxygen, nitrogen and/or sulfur as hetero atoms. Examples of the heterocyclic group are a pyridyl group, a furyl group, a thienyl group, a pyrrole group, an indolyl group, etc.

$A^2$ and/or $A^3$ in the group $$-N\begin{matrix} \diagup A^2 \\ \diagdown A^3 \end{matrix}$$

represented by

A preferably include(s) a hydrogen atom, an alkyl group having from 1 to 8 carbon atoms and an aryl group having from 6 to 10 carbon atoms, and in particular, both $A^2$ and $A^3$ especially preferably represent alkyl groups. If joined together, the ring to be formed by linkage of $A^2$ and $A^3$ is preferably a 6-membered ring.

Specific examples of $$-N\begin{matrix} \diagup A^2 \\ \diagdown A^3 \end{matrix}$$

include a diethylamino group, an anilino group, a piperidino group, a morpholino group, etc.

A is especially preferably an alkyl group having from 1 to 4 carbon atoms, a phenyl group (which may optionally be substituted by a sulfonylamino group, a sulfamoylamino group, a sulfonyl group, an acylamino group, a carboxyl group, a halogen atom, etc.), or a pyridyl group.

E is preferably a cyano group; an alkylsulfonyl group having from 1 to 6 carbon atoms (e.g., methylsulfonyl group, an ethylsulfonyl group, etc.); a phenylsulfonyl group having from 6 to 19 carbon atoms (e.g., a phenylsulfonyl group, a p-chlorophenylsulfonyl group, etc.); a hydrogen atom; a halogen atom (e.g., F, Cl, Br, etc.); a hydroxyl group; a carboxyl group; an alkyl group having from 1 to 4 carbon atoms (e.g., a methyl group, an isopropyl group, etc.); an aryl group having from 6 to 10 carbon atoms (e.g., a phenyl group, a naphthyl group, etc.}; a heterocyclic group (preferably a 5- or 6-membered heterocyclic group containing oxygen, nitrogen and/or sulfur as hetero atoms, such as a pyridyl group, a furyl group, a thienyl group, a pyrrole group, an indolyl group, etc.); or an alk- or aryloxy group or an alkyl- or arylthio group, which is preferably represented by the following formula (P) or (Q):

$$-OR_{1a} \tag{P}$$

$$SR_{2a} \tag{Q}$$

wherein $R_{1a}$ and $R_{2a}$ each represents a hydrogen atom, an alkyl group having from 1 to 8 carbon atoms or an aryl group having from 6 to 10 carbon atoms, and these alkyl or aryl groups optionally having substituent(s), which are preferably selected, for example, from an alkoxy group having from 1 to 5 carbon atoms, a halogen atom such as Cl, Br, etc., a cyano group, a sulfamoyl group or a sulfonylamino group having from 1 to 8 carbon atoms. Further, E in formula (II) may preferably an carbacylami group (e.g., an acetylamino group, a propionylamino group, an isobutylamino group, a benzoylamino group, etc.); a sulfonylamino group (e.g., a methanesulfonylamino group, an ethanesulfonylamino group, a benzenesulfonylamino group, etc.); a substituted or unsubstituted carbamoyl group (e.g., an ethylcarbamoyl group, a dimethylcarbamoyl group, etc.); or a substituted or unsubstituted amino group (e.g., a methylamino group, a diethylamino group, an anilino group, a morpholino group, etc.).

In particular, E is especially preferably a hydrogen atom, a cyano group, a methanesulfonyl group, a phenylsulfonyl group, a halogen atom or an amino group.

G is preferably an alkylsulfonyl group having from 1 to 6 carbon atoms (which may optionally contain an alkoxy group, etc. as a substituent), a phenylsulfonyl group (which may optionally contain an alkyl group, an alkoxy group, a halogen atom, etc. as a substituent) or a cyano group.

J is preferably a cyano group, an alkylsulfonyl group having from 1 to 6 carbon atoms (which may optionally have substituent(s), for example, a methylsulfonyl group, an ethylsulfonyl group, a chloromethylsulfonyl group, etc.), a phenylsulfonyl group having from 6 to 19 carbon atoms (which may optionally have substituent(s), for example, a phenylsulfonyl group, a p-chlorophenylsulfonyl group, etc.) or a halogen atom (e.g., Cl, Br, etc.).

G is especially preferably a cyano group, a methanesulfonyl group or a phenylsulfonyl group.

The linking group represented by X includes, for example, $-NR^6-$(wherein $R^6$ represents a hydrogen atom or an optionally substituted alkyl group), $-SO_2-$, $-CO-$, an alkylene group (which may optionally be substituted), a phenylene group (which may optionally be substituted), a naphthylene group (which may optionally be substituted), $-O-$, $-SO-$ or a combination of two or more of these groups. Among these linking groups, preferred are $NR^6-SO_2-$, $-NR^6-CO-$ or $-R^7-(L)_k-(R^8)_l-$, wherein $R^7$ and $R^8$, which may be the same or different, each represents an alkylene group (which may optionally be substituted) or an arylene group (which may optionally be substituted); L represents $$-O-,\ -CO-,\ -SO-,\ -SO_2-,\ -SO_2\overset{R^6}{\overset{|}{N}}-,\ -\overset{R^6}{\overset{|}{N}}SO_2-,$$

$$-CO\overset{R^6}{\overset{|}{N}}-\ \text{or}\ -\overset{R^6}{\overset{|}{N}}CO-;$$

k represents 0 or 1; and when k=1, then l represents 1, and when k=0, then l represents 1 or 0.

In addition, the combination of $-NR^6-SO_2-$ or $-NR^6-CO-$ and $-R^7-(L)_k-(R^8)_l-$ is also preferred.

Preferred examples of $R^7$ and $R^8$ include an alkylene group having from 1 to 6 carbon atoms (which may optionally be substituted by substituent(s) selected from an alkyl group having from 1 to 4 carbon atoms, an alkoxy group having from 1 to 3 carbon atoms, a hydroxyl group, a halogen atom, a cyano group, etc.), an arylene group having from 6 to 10 carbon atoms (which may optionally be substituted by substituent(s) selected from an alkyl group having from 1 to 4 carbon atoms, an alkoxy group having from 1 to 3 carbon atoms, an alkoxyalkoxy group having from 3 to 5 carbon atoms (e.g., a methoxyethoxy group), a hydroxyl group, a halogen atom, $-NHSO_2R^a$ (wherein $R^a$ represents a substituted or unsubstituted alkyl group having from 1 to 6 carbon atoms, a substituted or unsubstituted phenyl group having from 6 to 10 carbon atoms, or a substituted or unsubstituted aralkyl group having from 7 to 11 carbon atoms, $$-NHCOR^{1c},\ -SO_2N(R^{2c})(R^{3c})$$

(wherein $R^{1c}$, $R^{2c}$ and $R^{3c}$, which may be the same or different, each represents a hydrogen atom, a substituted or unsubstituted alkyl group having from 1 to 6 carbon atoms, a phenyl group or a substituted phenyl group), a cyano group, $$-SO_2R^{1c},\ -COR^{1c},\ -N(R^{4c})(R^{5c})$$

(wherein $R^{1c}$ is the same as defined above; and $R^{4c}$ and $R^{5c}$, which may be the same or different, each represents a hydrogen atom or a substituted or unsubstituted alkyl group having from 1 to 6 carbon atoms, or R4c and R&c are taken together to form an atomic group necessary for the formation of a 5- or 6-membered hetero ring (such as morpholino group)). Examples of suitable substituent(s) for the substituted alkyl group Of $R^{1c}$ to $R^{5c}$are an alkoxy group having from 1 to 4 carbon atoms and a halogen atom (e.g., Cl, Br, etc.). Examples of suitable substituent(s) for the substituted phenyl group Of $R^{1c}$ to $R^{3c}$are an alkyl group having 1 to 6 carbon atoms. The hetero atoms in the nitrogen-containing hetero ring to be formed by the linkage of $R^{4c}$ and $R^{5c}$ may include, in addition to the nitrogen atom, an oxygen atom, a sulfur atoms, etc., and one example of such a heterocyclic group is a morpholino group.

Among the groups represented by L, the most preferred one is $-SO_2NH-$.

Examples of $R^1$ and $R^6$ include a hydrogen atom and an alkyl group having from 1 to 4 carbon atoms (which may optionally have substituent(s) selected from a halogen atom, a hydroxyl group, an alkoxy group, a cyano group, etc.), and the case of the hydrogen atom is most preferred.

Y preferably represents a quaternary ammonium group represented by $-N^{\oplus}(A^1)_3$, wherein $A^1$'s may be the same or different and each represents an alkyl group having from 1 to 8 carbon atoms, a cycloalkyl group having from 5 to 8 carbon atoms, an aryl group having from 6 to 10 carbon atoms or an aralkyl group such as benzyl group. Each of these may optionally have substituent(s)

The novel dyes of the present invention have a betaine structure, whereby the hue variation which would conventionally be influenced by the dissociation or non-dissociation of the hydroxyl group of the 1-naphthol moiety of the coupling component because of the surrounding pH variation can be prevented and therefore a stable hue can be obtained.

In addition, the dyes of the present invention show an extremely sharp absorption spectrum (which is characterized by the narrow half-value width at $\lambda_{max}$, and the $\epsilon_{max}$ in the absorption spectrum is extremely large.

The above fact means that the dyeing power per monomolecule is high, and fibrous substances can be effectively dyed with a smaller amount of the dye of the present invention, resulting in a pure and beautiful blue to cyan color.

Among the betaine-type monoazo dyes of the present invention, those having the cyan dye anion group of formula (II) wherein $R^1$ is a hydrogen atom are especially preferred. In particular, the dye compounds of the following formulae (IA) and (IB) are more preferred:

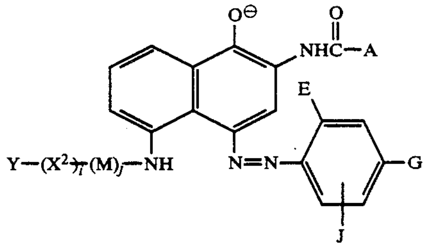

(IA)

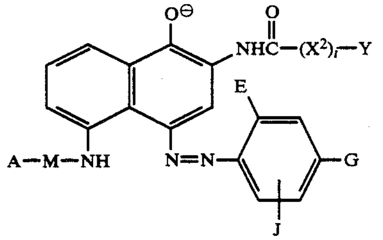

(IB)

wherein

M represents $-SO_2-$or $-C(=O)-$;

$X^2$ represents $-R^7-(L)_k-(R^8)_l-$;

$R^7$, $R^8$, L, Y, k, l, A, E, G and J have the same meanings as defined above; and i and j each represents 0 or 1.

In the above formulae (IA) and (IB), $X^2$ is especially preferably (*)-arylene-$SO_2NH$—alkylene—or (*)-arylene—$SO_2NH$—arylene—$SO_2NH$—alkylene, which is bonded to M or $-NHC(=O)-$ via (*).

The novel dyes of the present invention color in blue cyan with an extremely high color density to form a dense color, and the affinity and dyeability to fibrous materials are excellent. The present compounds may dye fibrous materials with the corresponding color almost without being influenced at all by the surrounding pH and temperature variation.

The materials thus dyed by the dyes of the present invention generally have extremely excellent light-fastness, heat set-fastness, swelling-fastness, sublimation-fastness, etc.

Specific examples of the compounds of formula (I) of the present invention and the spectral characteristics thereof are mentioned hereinafter, which, however, are not intended to restrict the scope of the present invention. In the following formulae, Ph represents a phenyl group.

The spectral characteristics have the following definitions. $\lambda_{max}$ gives the color tone; and $\epsilon_{max}$ means the measurement of the color strength, and the larger this value is, the higher the color strength is. The half-value width at $\lambda_{max}$ is the measurement of the spectral purity, and the smaller this value is, the sharper the absorption is with the higher spectral purity.

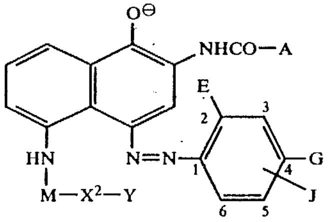
| No. | M | $X^2$ (bonded to M via (*)) | Y | A | E | G | J | $\lambda_{max}^{DMF}$ | $\epsilon_{max}^{DMF}$ | $\lambda_{max}^{DMF}{}_{1/2}$ |
|---|---|---|---|---|---|---|---|---|---|---|
| 1 | $-SO_2-$ | 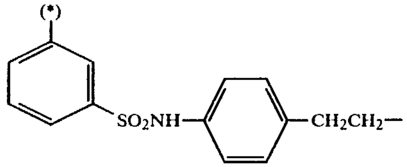 | $-N^{\oplus}(C_2H_5)_3$ | $-CH_3$ | $-SO_2Ph$ | $-SO_2CH_3$ | H | 618 nm | $9.73 \times 10^4$ | 58 nm |
| 2 | " | " | " | 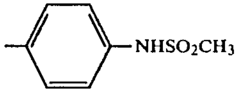 | $-SO_2CH_3$ | " | " | 617 nm | $7.92 \times 10^4$ | 58 nm |
| 3 | " | 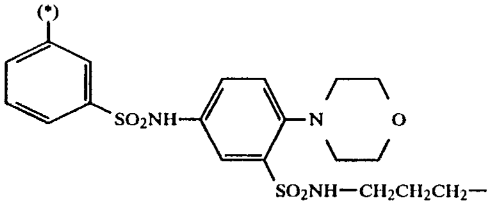 | " | 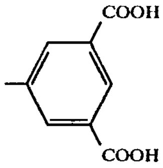 | $-CN$ | $-CN$ | $-CN$ (6-position) | 608 nm | $5.89 \times 10^4$ | 60 nm |
| 4 | " | 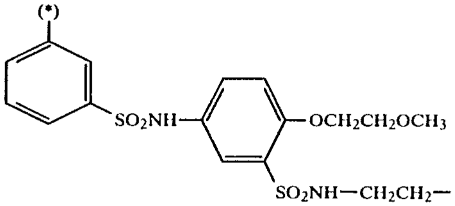 | $-N^{\oplus}(CH_3)_3$ | $-Ph$ | H | " | $-CN$ (3-position) | 630 nm | $9.31 \times 10^4$ | 55 nm |

-continued

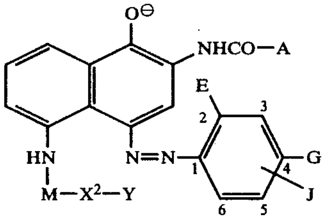

| No. | M | $X^2$ (bonded to M via (*)) | Y | A | E | G | J | $\lambda_{max}^{DMF}$ | $\epsilon_{max}^{DMF}$ | $\lambda_{max}^{DMF}{}_{1/2}$ |
|---|---|---|---|---|---|---|---|---|---|---|
| 5 | $-SO_2-$ | 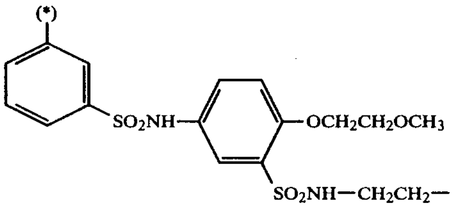 | $-N^{\oplus}(CH_3)_3$ | 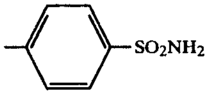 | $-CN$ | $-SO_2CH_3$ | H | 619 nm | $7.10 \times 10^4$ | 58 nm |
| 6 | " | " | $-N^{\oplus}(C_2H_5)_3$ | $-Ph$ | $-SO_2CH_3$ | " | " | 619 nm | $7.98 \times 10^4$ | 59 nm |
| 7 | " | " | $-N^{\oplus}(C_2H_5)_2$ (with $CH_3$ on N) | 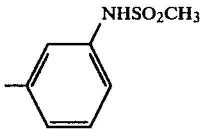 | $-CN$ | " | " | 617 nm | $7.63 \times 10^4$ | 58 nm |
| 8 | " | " | $-N^{\oplus}(C_4H_9)_3$ | $-C_2H_5$ | " | " | " | 613 nm | $7.83 \times 10^4$ | 55 nm |
| 9 | " | 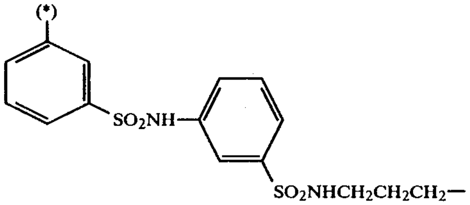 | $-N^{\oplus}(C_2H_5)_3$ | 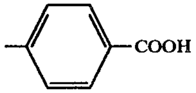 | " | " | " | 618 nm | $8.00 \times 10^4$ | 60 nm |
| 10 | " | " | $-N^{\oplus}(C_2H_5)_3$ (with $CH_3$ on N) | 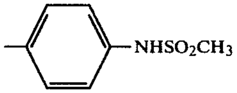 | " | " | " | 616 nm | $7.89 \times 10^4$ | 60 nm |

-continued

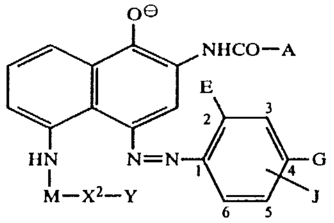

| No. | M | $X^2$ (bonded to M via (*)) | Y | A | E | G | J | $\lambda_{max}^{DMF}$ | $\epsilon_{max}^{DMF}$ | $\lambda_{max}^{DMF}\frac{1}{2}$ |
|---|---|---|---|---|---|---|---|---|---|---|
| 11 | " | (*) 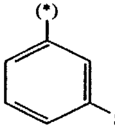 $SO_2NHCH_2CH_2$— | —$N^{\oplus}(CH_3)_3$ (with —$C_2H_5$ on N) | 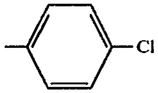 —Cl | —$SO_2CH_3$ | —CN | —CN (5-position) | 621 nm | $8.50 \times 10^4$ | 52 nm |
| 12 | —$SO_2$— | (*) 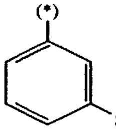 $SO_2NHCH_2CH_2$— | —$N^{\oplus}(C_2H_5)_2$ (with —$CH_3$ on N) | 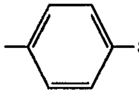 —$SO_2CH_3$ | —CN | —CN | —CN (5-position) | 623 nm | $8.82 \times 10^4$ | 51 nm |
| 13 | " | " | —$N^{\oplus}(C_2H_5)_3$ | 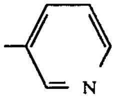 | " | " | —CN (5-position) | 625 nm | $8.27 \times 10^4$ | 55 nm |
| 14 | " | " | —$N^{\oplus}(C_4H_9)_2$ | 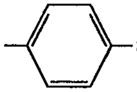 —$SO_2CH_3$ | H | " | —CN (3-position) | 631 nm | $9.23 \times 10^4$ | 53 nm |
| 15 | " | (*) 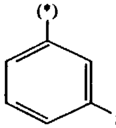 $SO_2NH$—$CH_2CH_2$— | —$N^{\oplus}(C_5H_{11})_3$ | 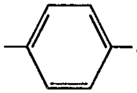 —$SO_2CH_3$ | " | " | —CN (3-position) | 630 nm | $9.17 \times 10^4$ | 56 nm |
| 16 | " | " | —$N^{\oplus}(CH_3)_2$ (with —Ph on N) | —$CH(CH_3)C_2H_5$ | —CN | " | —CN (5-position) | 632 nm | $9.00 \times 10^4$ | 56 nm |

-continued

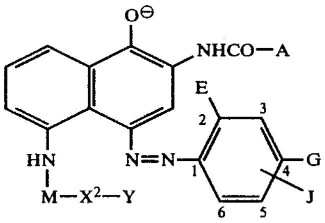

| No. | M | $X^2$ (bonded to M via (*)) | Y | A | E | G | J | $\lambda_{max}^{DMF}$ | $\epsilon_{max}^{DMF}$ | $\lambda_{max}^{DMF}{}_{\frac{1}{2}}$ |
|---|---|---|---|---|---|---|---|---|---|---|
| 17 | " | 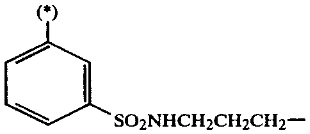 | $-N^{\oplus}(C_2H_5)_3$ | $-CH_2CH(CH_3)_2$ | —Cl | " | —CN (5-position) | 625 nm | $9.03 \times 10^4$ | 56 nm |
| 18 | " | " | $-N^{\oplus}(C_4H_9)_3$ | $-C_2H_5$ | —CN | $-SO_2CH_3$ | H | 611 nm | $7.58 \times 10^4$ | 58 nm |
| 19 | " | " | " | —Ph | $-SO_2CH_3$ | " | " | 618 nm | $7.36 \times 10^4$ | 58 nm |
| 20 | $-SO_2-$ | 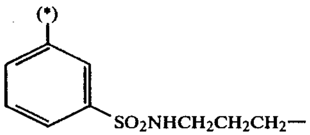 | $-N^{\oplus}(C_4H_9)_3$ | $-CH_3$ | —CN | —CN | H | 616 nm | $8.08 \times 10^4$ | 60 nm |
| 21 | " | " | " | —Ph | " | " | —CN (5-position) | 623 nm | $9.10 \times 10^4$ | 50 nm |
| 22 | " | " | " | 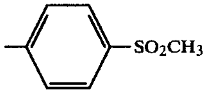 | —Br | —CN | —CN (5-position) | 631 nm | $9.45 \times 10^4$ | 55 nm |
| 23 | " | " | " | $-C_2H_5$ | —CN | $-SO_2-Ph$ | H | 624 nm | $8.30 \times 10^4$ | 57 nm |
| 24 | " | " | " | 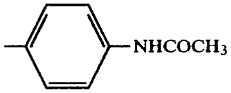 | —Br | —CN | —CN (5-position) | 630 nm | $9.45 \times 10^4$ | 55 nm |
| 25 | " | " | " | $-CH_3$ | $-SO_2CH_3$ | $SO_2CH_3$ | H | 611 nm | $7.56 \times 10^4$ | 53 nm |
| 26 | " | " | $-N^{\oplus}(CH_3)_2$(Ph) | $-C_2H_5$ | —Br | —CN | —CN (5-position) | 625 nm | $9.45 \times 10^4$ | 55 nm |

-continued

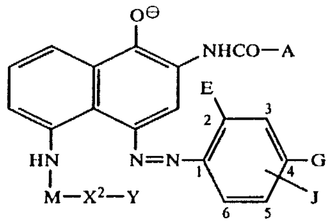

| No. | M | $X^2$ (bonded to M via (*)) | Y | A | E | G | J | $\lambda_{max}^{DMF}$ | $\epsilon_{max}^{DMF}$ | $\lambda_{max}^{DMF_{1/2}}$ |
|---|---|---|---|---|---|---|---|---|---|---|
| 27 | " | " | 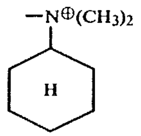 | " | H | " | —CN (5-position) | 625 nm | $9.19 \times 10^4$ | 60 nm |
| 28 | " | " | $—N^{\oplus}(CH_3)_2$ with —Ph on N | —Ph | —CN | " | —CN (5-position) | 623 nm | $9.10 \times 10^4$ | 50 nm |
| 29 | $—SO_2—$ | 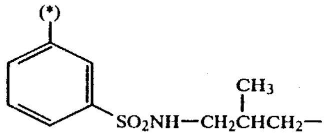 | $—N^{\oplus}(C_2H_5)_3$ | 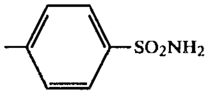 | —CN | —CN | H | 621 nm | $8.12 \times 10^4$ | 60 nm |
| 30 | " | " | $—N^{\oplus}(C_4H_9)_3$ | 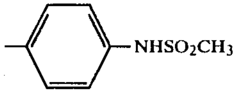 | $—SO_2CH_3$ | $—SO_2CH_3$ | H | 618 nm | $7.65 \times 10^4$ | 59 nm |
| 31 | —CO— | 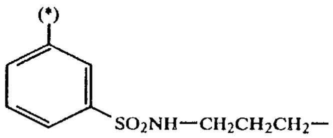 | $—N^{\oplus}(C_2H_5)_3$ | —Ph | " | —CN | —CN (5-position) | 619 nm | $8.32 \times 10^4$ | 52 nm |
| 32 | " | " | $—N^{\oplus}(C_4H_9)_3$ | " | —CN | " | H | 621 nm | $8.08 \times 10^4$ | 60 nm |
| 33 | " | " | 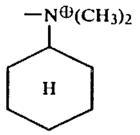 | " | $—SO_2CH_3$ | $—SO_2CH_3$ | H | 617 nm | $7.10 \times 10^4$ | 61 nm |

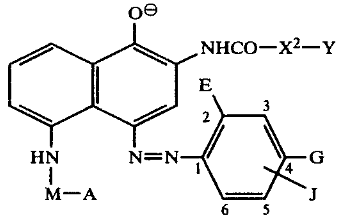

| NO. | M | A | X² (bonded to $-\overset{O}{\overset{\|}{C}}-$ via (*)) | Y | E | G | J | $\nu_{max}^{DMF}$ | $\epsilon_{max}^{DMF}$ | $\lambda_{max}^{DMF}{}_{\frac{1}{2}}$ |
|---|---|---|---|---|---|---|---|---|---|---|
| 34 | $-SO_2-$ | $-CH_3$ | 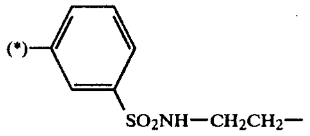 | $-N^{\oplus}(CH_3)_3$ | $-SO_2Ph$ | $-CN$ | $-CN$ (5-position) | 620 nm | $8.20 \times 10^4$ | 53 nm |
| 35 | " | " | " | $-N^{\oplus}(C_5H_{11})_3$ | " | " (5-position) | $-CN$ | 616 nm | $9.00 \times 10^4$ | 55 nm |
| 36 | " | " | " | $-N^{\oplus}(CH_3)_2(Ph)$ | $-SO_2CH_3$ | $-SO_2CH_3$ | H | 618 nm | $7.09 \times 10^4$ | 60 nm |
| 37 | " | " | 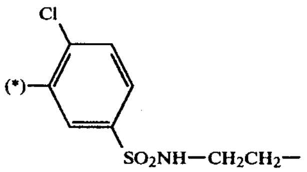 | $-N^{\oplus}(C_2H_5)_3$ | " | " | " | 616 nm | $8.01 \times 10^4$ | 59 nm |
| 38 | " | " | 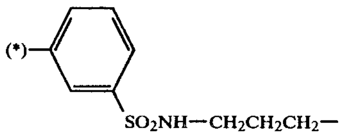 | $-N^{\oplus}(C_4H_9)_3$ | H | $-CN$ | $-CN$ (3-position) | 630 nm | $9.32 \times 10^4$ | 55 nm |
| 39 | $-SO_2-$ | $-CH_3$ | 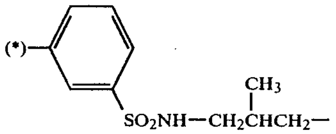 | $-N^{\oplus}(C_2H_5)_3$ | $-N(CH_3)_2$ | $-CN$ | $-CN$ (5-position) | 665 nm | $8.38 \times 10^4$ | 70 nm |
| 40 | " | " | " | $-N^{\oplus}(C_4H_9)_3$ | $-CN$ | $-SO_2Ph$ | H | 625 nm | $7.00 \times 10^4$ | 58 nm |

All the above-mentioned Compound Nos. (1) to (40) have a melting point of 300° C. or higher. For reference, spectral characteristic values of some known cyan dyes are shown hereunder.

The dyes of the present invention can typically be produced in accordance with the following production routes.

| Dye | $\lambda_{max}^{DMF}$ | $\epsilon_{max}^{DMF}$ | $\lambda_{max}^{DMF}\frac{1}{2}$ |
|---|---|---|---|
| 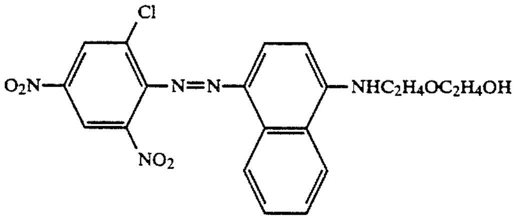 | 612 nm | $3.76 \times 10^4$ | 98 nm |
| 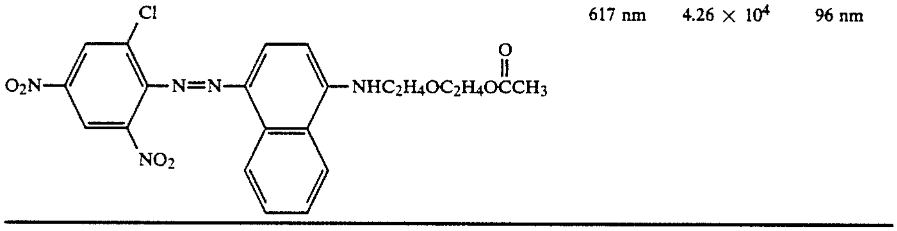 | 617 nm | $4.26 \times 10^4$ | 96 nm |

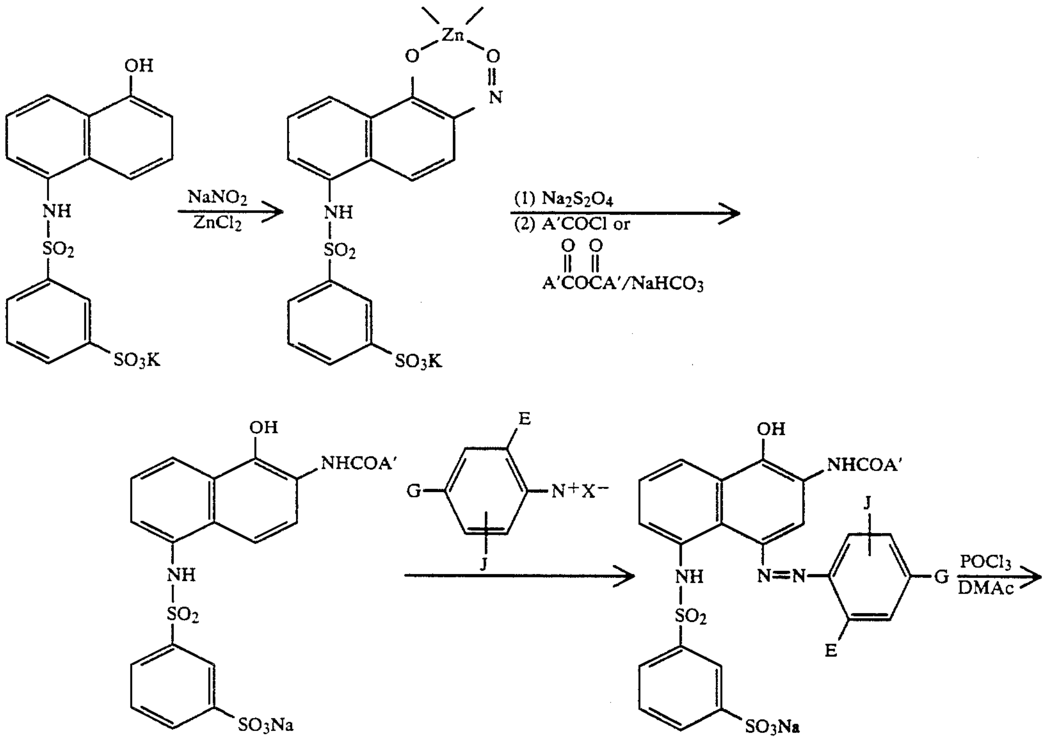

-continued
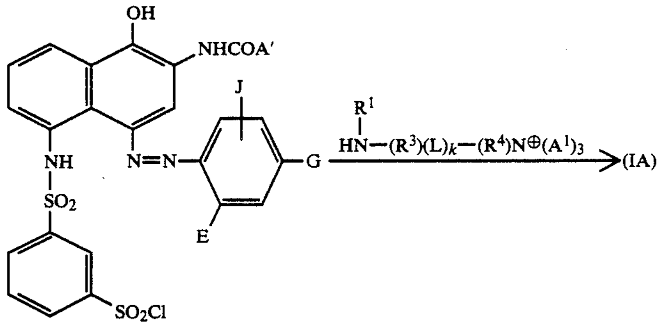
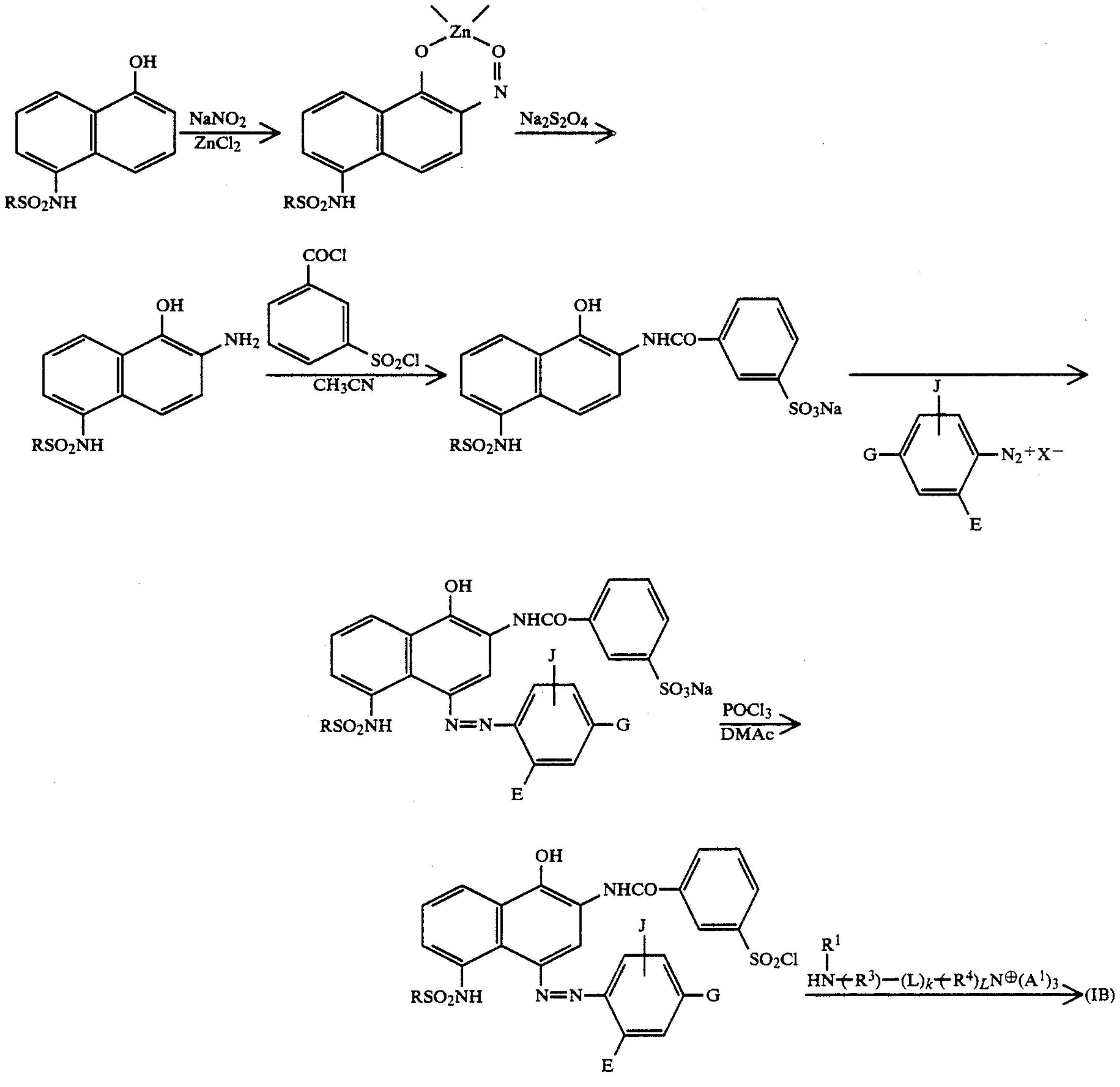
In the above reaction schemes, DMAc means dimethylacetamide; $A^1$ is the same as defined above; and A' has the same meaning as in A.
Specific synthesis examples of some typical dyes represented by formula (1) are described hereunder.
Synthesis Example 1:

Synthesis of Compound No. (38):

(a) Synthesis of Compound No. (38-a)

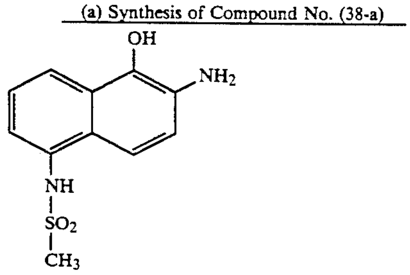

(38-a)

A mixture comprising 119 g of 5-methanesulfonylamino-1-naphthol, 100 g of zinc chloride and 500 ml of ethanol was heated at 50° C., and then a solution of 35 g of sodium nitrite as dissolved in 70 ml of water was added dropwise thereto at 50° to 65° C. After being heated and stirred at 60° to 65° C. for 2 hours, the resulting solution was cooled with water to room temperature, and reddish brown crystals formed were taken out by filtration and washed with ethanol. The crystals were added to 200 ml of concentrated hydrochloric acid and stirred for 1 hour at room temperature, and then 200 ml of water was added thereto. Yellowish brown crystals (2-nitroso-5-methanesulfonylamino-1-naphthol) formed were taken out by filtration, washed with water and dried. Yield: 90 g.

30 g of the above-mentioned nitroso compound was dissolved in 300 ml of a 10% sodium hydroxide aqueous solution, and 70 g of sodium hydrosulfite was gradually added thereto. After the color of the solution varied from dark red to pale orange, this solution was cooled with ice and then neutralized with dilute hydrochloric acid.

The pale pink precipitate formed was taken out by filtration, washed with water and then dried under reduced pressure to obtain 20 g of 2-amino-5-methanesulfonylamino-1-naphthol (Compound No. (38-a)).

(b) Synthesis of Compound No. (38-b):

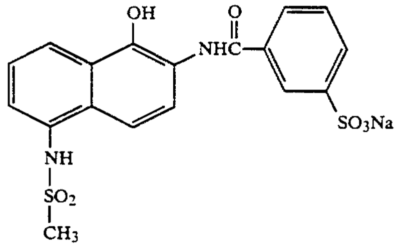

(38-b)

25 g of 2-amino-5-methanesulfonylamino-1-naphthol (38-a) was added to a mixture comprising 130 ml of acetonitrile and 32 ml of pyridine and, while being stirred at 5° C. or lower, a solution of 24 g of 3-chlorosulfonyl-benzoic acid chloride as dissolved in 24 ml of acetonitrile was added dropwise thereto. The whole mixture was stirred for 1 hour at the same temperature and then reacted for an additional 1 hour at room temperature. The reaction mixture was poured into 1.3 l of a cold 10% aqueous salt solution containing 50 ml of 36% hydrochloric acid with stirring. The whole mixture was further stirred for 1 hour at room temperature. Crystals precipitated were taken out by filtration, washed with a 5% aqueous salt solution and dried to obtain 40 g of sodium 2-(3-sulfobenzoylamino)-5-methylsulfonylamino-1-naphthol as pale brown crystals (Compound No. (38-b)).

(c) Synthesis of Compound No. (38-c):

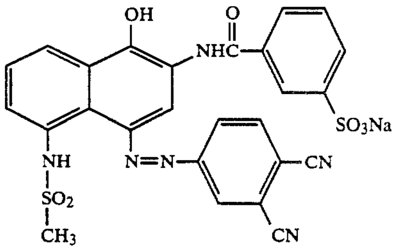

(38-c)

4.4 g of 3,4-dicyanoaniline was diazotized with nitrosylsulfuric acid in a conventional manner.

9.6 g of Compound No. (38-b) was dissolved in 70 ml of methyl cellosolve and 70 ml of water and, while being stirred at 5° C. or lower, the previously produced diazonium salt was added thereto. After being stirred for 30 minutes at 5° C. or lower and then for 1 hour at room temperature, the reaction mixture was poured into 1 l of a 10% aqueous salt solution at 50° C. with stirring. This was further stirred for 2 hours as such, and crystals precipitated were taken out by filtration, washed with a 5% aqueous salt solution and dried to obtain 14 g of sodium 2-(3-sulfobenzoylamino)-4-(3,4-dicyanophenylazo)-5-methylsulfonylamino-1-naphthol as reddish brown crystals (Compound No. (38-c)).

(d) Synthesis of Compound No. (38-d):

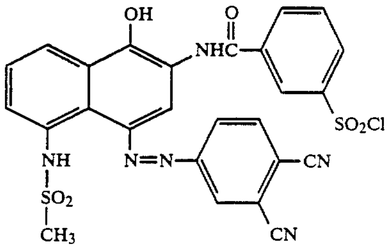

(38-d)

14 ml of phosphorus oxychloride was added dropwise to a mixture comprising 14 g of Compound No. (38-c), 70 ml of acetonitrile and 7 ml of dimethylacetamide at room temperature with stirring. After the completion of the dropwise addition, the whole mixture was stirred for 2 hours at 60° C. After being cooled to 10° C. or lower, the reaction mixture was poured into 500 ml of ice-water with stirring. Crystals precipitated were taken out by filtration, fully washed with water and dried with air to obtain 2-(3-chlorosulfonylbenzoylamino)-4-(3,4-dicyanophenylazo)-5-methylsulfonylamino-1-naphthyol (Compound No. (38-d)). Yield: 10 g.

(e) Synthesis of Compound No. (38-e):

$$H_2NCH_2CH_2CH_2N^{\oplus}(C_4H_9\text{—}n)_3 \qquad (38\text{—}e)$$

This compound (3-aminopropyl-tri-n-butylammonium) was produced in accordance with the methods as described in the following literature references:

(i) Organic Syntheses, collect volume 1, 119
(ii) Organic Syntheses, collect volume 2, 84
(iii) Organic Syntheses, collect volume 3, 256

(f) Synthesis of Compound No. (38):

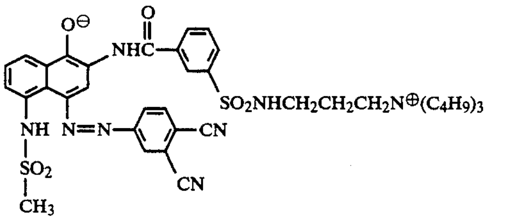

(38)

A mixture comprising 9.7 g of Compound No. (38-d) and 50 ml of dimethylacetamide was cooled to 5° C. or lower, and while being stirred, 13.8 g of Compound No. (38-e) was added thereto in five parts. The whole mixture was stirred for 30 minutes at the same temperature and then for 1 hour at room temperature. The reaction mixture was added to a 10% aqueous salt solution with stirring, and crystals precipitated were taken out by filtration, washed with a 5% aqueous salt solution and fully dried. The crude crystals thus obtained were recrystallized from methanol/acetone to obtain 5 g of the titled compound (i.e., 2-(3-tri-n-butylammoniopropylaminosulfonylbenzoylamino) 4 (3,4-dicyanophenylazo)-5-methylsulfonylamino-1-naphthalate) having a melting point of 300° C. or higher.

Synthesis Example 2:

Synthesis of Compound No. (25):

(a) Synthesis of Compound No. (25-a):

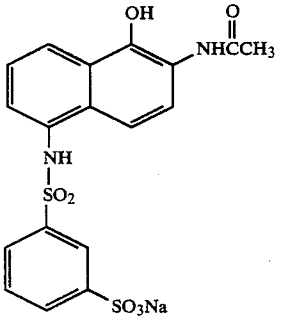

(25-a)

A mixture comprising 209 g of sodium 5-(3-sulfophenylsulfonylamino)-1-naphthol, 136 g of zinc chloride, 500 ml of ethanol and 100 ml of water was heated to 50° C., and a solution of 39 g of sodium nitrite as dissolved in 100 ml of water was added dropwise thereto at 50° to 60° C. After being heated and stirred for 3 hours at 60° C., the reaction mixture was allowed to stand for cooling to room temperature, and reddish brown crystals (2-nitroso form/zinc chelate) formed were taken out by filtration and washed with ethanol.

A mixture comprising 96 g of the above-mentioned crystals, 80 g of sodium hydrosulfite, 50 ml of methanol and 400 ml of water was heated to 60° C. in a nitrogen atmosphere and stirred for 30 minutes at 60° C. After being cooled to 20° C., 25.2 g of sodium hydrogencarbonate was added, and then 25 g of acetic anhydride was added dropwise at 15° to 20° C.

After being stirred for 30 minutes at 20° C., the reaction mixture was gradually heated up to 60° C. and heated at 60° C. for 30 minutes. 50 ml of a saturated sodium hydrogencarbonate aqueous solution and 200 ml of a saturated salt aqueous solution were added, and then the whole mixture was cooled to 10° C. and stirred for 1 hour at 10° C. to obtain sodium 2-acetylamino-5-(3-sulfophenyl-sulfonylamino-1-naphthol as white crystals (Compound No. (25-a)). The crystals were taken out by filtration, washed with an aqueous salt solution and dried. Yield: 108 g.

(b) Synthesis of Compound No. (25-b):

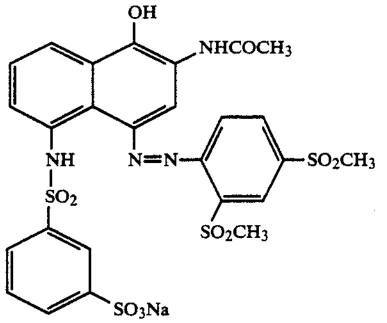

(25-b)

27 g of Compound No. (25-a) was added to a mixture comprising 4 g of sodium hydroxide, 103 g of sodium acetate, 100 ml of dimethylformamide and 200 ml of water and stirred for 30 minutes at 50° C.

After being cooled to 5° C., a solution of 2,4-dimethanesulfonylaniline diazonium (corresponding to 0.07 mol) was added at 5° to 8° C. After being stirred for 1 hour at 10° C., crystals formed were taken out by filtration, washed with an aqueous salt solution and dried to obtain 28 g of sodium 2-acetylamino-4-(2,4-dimethylsulfonylphenylazo)-5-(3-sulfophenylsulfonylamino)-1 naphthol as greenish brown crystals (Compound No. (25b)).

(c) Synthesis of Compound No. (25-c):

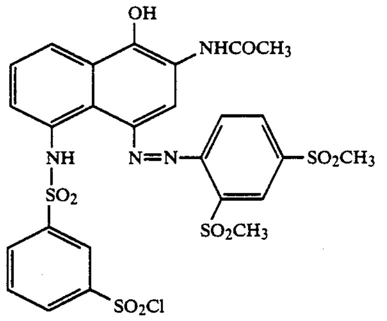

(25-c)

25 g of Compound No. (25-b) was finely pulverized and added to a mixture comprising 75 ml of dimethylacetamide and 100 ml of acetonitrile. 50 ml of phosphorus oxychloride was added dropwise thereto with stirring at 28° to 32° C. After being stirred for 5 hours at 30° to 35° C., the reaction mixture was poured into ice-water, and a orangish red precipitate formed was taken out by filtration, washed with water and dried with air to obtain 14 g 2-acethlamino-4-(2,4-dimethylsulfonylphenylazo)-5-(3-chlorosulfonylphenylsulfonylamino)-1-naphthol (Compound No. (25-c)).

(d) Synthesis of Compound No. (25):

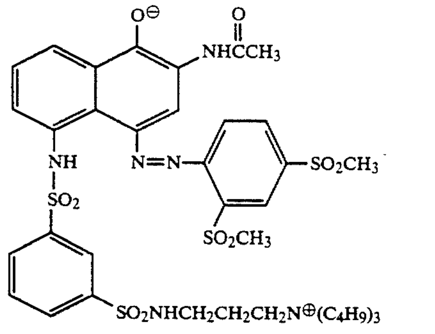

(25)

A mixture comprising 9.7 g of Compound No. (25-c) and 50 ml of dimethylacetamide was cooled to 5° C. or lower, and 13.8 g of Compound No. (38-e) (shown in Synthesis Example 1 above) was added thereto in five parts with stirring. The resulting mixture was stirred for 30 minutes at the same temperature and then for 1 hour at room temperature. The resulting reaction mixture was added to a 10% aqueous salt solution with stirring, and crystals precipitated were taken out by filtration, washed with a 5% aqueous salt solution and then fully dried. The crude crystals thus obtained were recrystallized from methanol/acetone to obtain 5 g of the titled compound (i.e., 2-acethylamino-4-(2,4-dimethylsulfonylphenylazo)-5-{3-(3-tri-n-butylammonio-propylaminosulfonyl}-1-naphthalate) having a melting point of 300° C. or higher.

The dyes of the present invention are also suitable for dyeing and printing of fibrous materials made of polyamides, polyurethanes, polyolefins or polyvinyl chloride; and hydrophobic substances such as aromatic polyesters, cellulose 2½-acetate, cellulose triacetate and polyacrylonitrile as well as natural fibers such as cotton, wool and silk.

In addition, the dyes of the present invention are also suitable for dyeing and printing of fibrous clothes, fibrous yarns, endless yarns, carded substances or randomized substances as well as clothes comprising mixtures of the above-mentioned fibers and natural clothes such as cotton, wool or silk, or clothes comprising mixtures of different hydrophobic substances.

To effect dyeing with the dyes of the present invention, the substance to be dyed is introduced into a dye-containing aqueous dispersion or solution formed by adding to the dye a conventional auxiliary additive, for example, selected from sodium salts, highly condensed naphthalene-sulfonic acid/formaldehyde resins, sulfite cellulose-decomposed products, condensation products of higher alcohols and ethylene oxide, fatty acid amide or alkylphenol polyglycol ethers, sulfosuccinates and Turkey red oil, at an elevated temperature, for example, 40° C., and then, the dye bath is heated to the optimum dyeing temperature, preferably between 70° and 140° C. in accordance with the type of the substance to be dyed, and this temperature is maintained as such until the desired color depth is attained.

After the bath has cooled, the dyed substance is subjected to post-treatment; for example, in the case of acetate fibers, the dyed fibers are treated with a soap, or in the case of aromatic polyester fibers, the dyed fibers are subjected to reductive post-treatment by the addition of an alkali thereto. These post-treatment procedures are well understood by those skilled in the art.

When aromatic polyesters, triacetate fibers or polyvinyl chloride are/is dyed at temperatures of up to 105° C., the addition of a conventional carrier substance, for example, selected from mono , di- or trichlorobenzene, diphenyl, o-hydroxydiphenyl, benzoic acid, salicylic acid, methyl salicylate, methyl cresotinate, p-chlorophenoxyethanol or benzyl alcohol, to the dye-containing aqueous dispersion or solution is generally advantageous.

The pH value of the dye bath may fall within the range of from about 2 to about 11, but the dyeing is advantageously carried out in an acidic condition with an acidic bath to which an organic acid such as formic acid or acetic acid or an inorganic acid such as sulfuric acid or phosphoric acid has been added.

The dyeing can be carried out at a temperature of about 100° C. or higher under pressure, as the case may be.

When printing with the dyes of the present invention is conducted, the dye of the formula (I) or two or more thereof is(are) kneaded with conventional dye additives such as a stock paste thickener, a dye solubilizer, a dyeing promoter, a carrier, a stabilizer, a reduction inhibitor or other known auxiliary agents to obtain a color paste, and the resulting paste is then printed on the substance to be printed and then heat-treated, especially heated with steam, for fixation of the dye on the substance.

The dyes of the present invention can be also used after being dissolved in a water-miscible organic solvent or diluting agent together with an appropriate acid. The dyes of the present invention can be used for dyeing synthetic fibrous materials in the same manner as the case of using a disperse dye for the fibrous materials. Accordingly, when the dye is used in the form of a water dispersion, the dispersion can be applied to dip dyeing, padding or printing in accordance with the conditions and by the use of the additives which are generally used in practice with a conventional dye dispersion. Particularly, the above-mentioned dyes can be used for selectively dyeing synthetic fibrous materials by a solvent method, for example, the dye is dissolved or dispersed in perchloroethylene, trichloroethylene or the like, optionally containing a small amount of water, to obtain a solution or dispersion, and this resulting solution or dispersion is then applied to the fibrous materials at an elevated temperature.

The dyes of the present invention can also be used for melt dyeing of synthetic polymers, especially for post-injection dyeing thereof, and the thus-dyed polymers can be melt spun to form fibers or filaments. Particularly, the dyes can also be selectively used for transfer printing of synthetic fibrous materials.

The following Examples are intended to illustrate the present invention but are not to be construed as limiting the scope of the present invention in any manner. Unless otherwise indicated, all parts, percents, ratios and the like are by weight.

EXAMPLE 1

1 g of sulfamic acid and 4 g of boric acid were thoroughly blended with 20 g of a fine powder of Compound No. (25) to prepare a dye composition.

0.2 g of the above-mentioned dye composition was dissolved in 10 g of hot water, and this was diluted with 500 g of water. Further, 0.1 g of acetic acid, 0.15 g of sodium acetate and 0.15 g of a nonionic surfactant were added to prepare a dye bath. 10 g of polyacrylonitrile fiber, Vonnel® 17 (trade name by Mitsubishi Rayon Co., Ltd.) was dipped in this dye bath, the bath was heated to 90° C. over 40 minutes, and dyeing was carried out for 1 hour at this temperature. After dyeing, the fiber was washed with water and then treated in 500 g of a soaping bath containing a 0.5% detergent for 10 minutes at 80° to 95° C. and thereafter washed with water and dried.

Thus, the polyacrylonitrile fiber was dyed in a sharp blue color, and the light-fastness and heat-fastness of the dyed product were excellent.

EXAMPLE 2

70 g of a paste formed from 150 g of water and 100 g of Yuzen paste (powder) was blended with 30 g of a paste formed from 100 g of nafka crystal gum and 200 g of water to prepare 100 g of a stock paste thickener.

1 g of the powdered dye composition as prepared in Example 1 was dissolved in a proper amount of hot water together with 1.5 g of thiodiethylene glycol (Glyecine A), 2 g of 30% acetic acid and 1 g of 50% tartaric acid, and 60 g of the above-mentioned stock paste thickener was added thereto and thoroughly blended. Then, 4 g of a 50% resorcinol solution was added thereto to obtain 100 g of a color paste. The same polyacrylonitrile fiber as used in Example 1 was printed with the thus-obtained color paste and predried at 50° C., and then dried with steam at 100° C. for 30 minutes. The thus printed fiber was washed with water, soaped at 70° C. for 20 minutes, and then washed with water and dried.

Thus, the polyacrylonitrile fiber was printed in blue with excellent color-fastness.

EXAMPLE 3

10 g of Compound No. (33) was milled with about 2.5 g of a lignin sulfonate dispersing agent and water in a colloid mill or sand mill, whereby a dye-containing composition which is commercially advantageous could be obtained. The milling was continued until a fine and stable aqueous dispersion or paste could be obtained and the grain size of the dye powder contained therein became about 1μ.

| Aqueous Dyeing (under Pressure): | |
|---|---|
| Aqueous Dye Paste Containing Dye of Example 1 (active ingredient 15%) | 0.1 g |
| "Avitone ® T" (a trade mark of E. I. Du Pont de Nemours and Company for sodium hydrocarbon-sulfonate, 10% solution) | 1.0 ml |
| "Merpol ® HCS" (a trade mark of E. I. Du Pont de Nemours and Company for long-chain alcohol-ethylene oxide adduct, 10% solution) | 0.5 ml |
| Sodium Ethylenediaminetetraacetate (1% solution) | 1.25 ml |
| Butyl Benzoate Carrier (10% emulsion) | 1.5 ml |
| Water to make | 75 ml |
| Acetic Acid to make | pH 5.5 |

5 g of a commercially available polyester fabric "Dacron ®54" (a trade mark of E. I. Du Pont Nemours and Comapany)was put in an autoclave containing the above-mentioned components, and this was dyed at 265° F. (129° C.) for 1 hour therein. After dyeing, the dyed fabric was rinsed with water and then dried. The thus dyed fabric had a cyan color with excellent light-fastness and high sublimation-fastness.

EXAMPLE 4

Thermosol Method:

"Dacron ®" (a trade mark of E. I. Du Pont de Nemours and Company) polyester fabric was dipped in an aqueous bath containing a 1% commercially available ether-alcohol sulfate surfactant (detergent) and 1% tetrasodium pyrophosphate at 82° C. for 15 minutes. The fabric was washed with a cold water, dried and then padded in a dye bath having the following composition, the dipped amount being from 50 to 60% of the weight of the dry fabric.

| Padding Bath Composition: | |
|---|---|
| Aqueous Dye Paste Containing the Dye of Example 2 (active ingredient, 15%) | 50 g |
| Purified Natural Gum Tackifier | 20 g |
| Water to make | 1 l |

The thus padded fabric was passed through an infrared pre-drier and then heated to 213° C., whereupon the fabric was kept at this temperature for 90 seconds. The thus-treated fabric was washed with water at 27° C. and scoured in water containing a 1% commercially available ether-alcohol sulfate detergent at 93° C. for 5 minutes. Afterwards, this was washed with water at 27° C. and then dried. The thus dyed polyester fabric had a fascinating cyan color with extremely high sublimation-fastness.

While the invention has been described in detail and with reference to specific embodiments thereof, it will be apparent to one skilled in the art that various changes and modifications can be made therein without departing from the spirit and scope thereof.

What is claimed is:

1. A betaine-type monoazo dye represented by formula (I):

$$\text{Dye—x—y} \quad \text{(I)}$$

wherein Dye represents a cyan dye anion represented by formula (II);

X represents a bond or linking group;

Y represents quaternary ammonium; and

Dye and X are bonded to each other via A, $B^1$, $B^2$, $B^3$, $B^4$ or $B^5$ in formula (II):

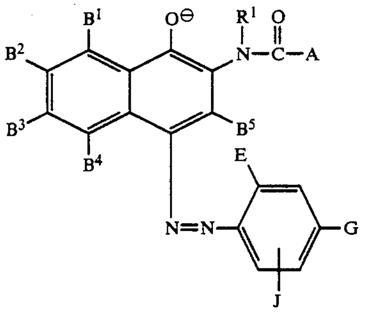

wherein $B^1$, $B^2$ $B^3$, $B^4$ and $B^5$ are the same or different, and each represents a member selected from the group consisting of a bond, hydrogen, alkyl halogen, $—OR^4$, $—CO_2R^4$,

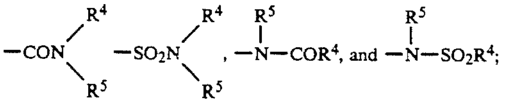

wherein $R^4$ and $R^5$ are the same or different and each represents a member selected from the group consisting of hydrogen, alkyl and aryl, or $R^4$ and $R^5$ are taken together to form a 5- or 6- membered heterocyclic ring containing oxygen, nitrogen, sulfur or combinations thereof as heteroatoms;

A represents a member selected from the group consisting of hydrogen, alkyl, aryl, cycloalkyl, a 5- or 6-membered heterocyclic ring containing oxygen, nitrogen, sulfur or combinations thereof as heteroatoms and

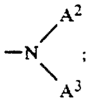

wherein $A^2$ and $A^3$ have the same meaning as A, or $A^2$ and $A^3$ are bonded to each other to form a 5- or 6-membered heterocyclic ring containing oxygen, nitrogen, sulfur or combinations thereof as heteroatoms;

E represents a member selected from the group consisting of hydrogen, halogen, cyano, hydroxyl, carboxyl, alkyl aryl, a 5-or 6-membered heterocyclic ring containing oxygen, nitrogen, sulfur or combinations thereof as heteroatoms, alkoxy, aryloxy, alkylthio. arylthio, carbacylamino. sulfonylamino, carbamoyl, amino, alkylsulfonyl and phenylsulfonyl;

G represents a member selected from the group consisting of cyano, alkylsulfonyl and phenylsulfonyl;

J represents a member selected from the group consisting of hydrogen, halogen, cyano, alkylsulfonyl and phenylsulfonyl; and $R^1$ represents a member selected from the group consisting of hydrogen and alkyl.

2. The betaine-type monoazo dye as in claim 1, wherein $R^1$ represents hydrogen.

3. The betaine-type monoazo dye as in claim 1, which is represented by formulae (IA) or (IB):

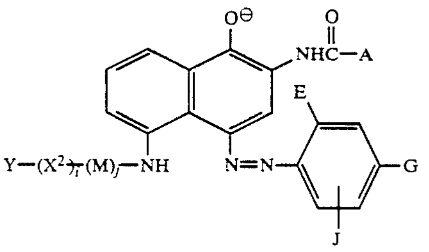

(IA)

-continued

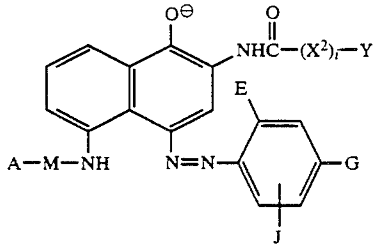

(IB)

wherein M represents a member selected from the group consisting of:

$-SO^2-$ or $-C(=O)-$;

$X^2$ represents $-R^7-(L)_k-(R^8)-$;

$R^7$ and $R^8$ are the same or different, and each represents a member selected from the group consisting of an alkylene group, a phenylene group and a naphthylene group;

L represents a member selected from the group consisting of $-O-$, $-CO-$, $-SO-$, $SO_2-$, $-SO_2N(R^6)-$, $-N(R^6)SO_2$, $-CON(R^6)-$ and $-N(R^6)CO-$, wherein $R^6$ represents a member selected from the group consisting of hydrogen and an alkyl group;

k represents 0 or 1;

l represents 1 when k=1, or represents 1 or 0 when k=0;

i and j each represent 0 or 1; and

Y, A, E, G and J have the same meanings as defined in claim 27.

4. The betaine-type monoazo dye as in claim 1, wherein A represents a member selected from the group consisting of linear, branched or cyclic alkyl group having from 1 to 8 carbon atoms, a 5- or 6-membered cycloalkyl having from 5 to 8 carbon atoms, an aryl group having from 6 to 10 carbon atoms, and a 5- or 6-membered heterocyclic ring containing oxygen, nitrogen, sulfur or combinations thereof as heteroatoms.

5. The betaine-type monoazo dye as in claim 4, wherein A represents a member selected from the group consisting of alkyl having from 1 to 4 carbon atoms, pyridyl, phenyl, and phenyl substituted by a member selected from the consisting of sulfonylamino, sulfamoylamino, sulfonyl, carbacylamino, carboxyl and halogen.

6. The betaine-type monoazo dye as in claim 1, wherein E represents a member selected from the group consisting of hydrogen, cyano, alkylsulfonyl having from I to 6 carbon atoms, phenylsulfonyl having from 6 to 19 carbon atoms, halogen, hydroxyl, carboxyl, alkyl having from 1 to 4 carbon atoms, aryl having from 6 to 10 carbon atoms, a 5- or 6-membered heterocyclic ring containing oxygen, nitrogen, sulfur or combinations thereof as heteroatoms, and alk- or aryloxy or alkyl- or arylthio represented by formulae (P) or (Q):

$OR_{1a}$ (P)

$SR_{2a}$ (Q)

wherein $R_{1a}$ and $R_{2a}$ each represents a member selected from the group consisting of hydrogen, an alkyl group having from 1 to 8 carbon atoms, an aryl group having from 6 to 10 carbon atoms, carbacylamino, sulfonylamino, a carbamoyl group and an amino group.

7. The betaine-type monoazo dye as in claim 6, wherein E represents a member selected from the group consisting of hydrogen, cyano, methanesulfonyl, phenylsulfonyl, halogen and an amino group.

8. The betaine-type monoazo dye as in claim 1, wherein G represents a member selected from the group consisting of an alkylsulfonyl group having from 1 to 6 carbon atoms, a phenylsulfonyl group and cyano.

9. The betaine-type monoazo dye as in claim 8, wherein G represents a member selected from the group consisting of cyano, methanesulfonyl and phenylsulfonyl.

10. The betaine-type monoazo dye as in claim 1, wherein J represents a member selected from the group consisting of cyano, an alkylsulfonyl group having from 1 to 6 carbon atoms, a phenylsulfonyl group having from 6 to 19 carbon atoms and halogen.

11. The betaine-type monoazo dye as in claim 1, wherein the linking group represented by X is $—NR^6$, wherein $R^6$ represents a member selected from the group consisting of hydrogen, an alkyl group, $—SO_2—$, —CO—, an alkylene group, anaphthylene group, —O—, —SO—, and a combination thereof.

12. The betaine-type monoazo dye as in claim 1, wherein $R^1$ represents a member selected from the group consisting of alkyl having from 1 to 4 carbon atoms, and alkyl having from 1 to 4 carbon atoms substituted by a member selected from the group consisting of halogen, hydroxy, alkoxy and cyano.

13. The betaine-type monoazo dye as in claim 1, wherein quaternary ammonium represented by Y is $—N(A^1)_3$, wherein $A^1$'s are the same or different and each represents a member selected from the group consisting of an alkyl group having from 1 to 8 carbon atoms, a cycloalkyl group having from 5 to 8 carbon atoms, an aryl group having from 6 to 10 carbon atoms, or an aralkyl group.

* * * * *